United States Patent [19]

Kulig

[11] Patent Number: 4,656,874
[45] Date of Patent: Apr. 14, 1987

[54] FLOWMETER WITH ELECTRONICALLY ADJUSTABLE MEASUREMENT MODULE AND DISPLAY

[75] Inventor: Frank M. Kulig, Bloomfield, Conn.

[73] Assignee: The J. M. Ney Company, Bloomfield, Conn.

[21] Appl. No.: 807,367

[22] Filed: Dec. 10, 1985

[51] Int. Cl.⁴ .......................... G01F 1/22; G01F 15/06
[52] U.S. Cl. .................................. 73/861.55; 73/198; 73/861.02
[58] Field of Search ................ 73/198, 861.55, 861.56, 73/861.57, 861.02, 861.03; 340/716, 753, 754

[56] References Cited

U.S. PATENT DOCUMENTS

| | | |
|---|---|---|
| 3,416,370 | 12/1968 | Kaucher et al. ................ 73/861.55 |
| 3,739,159 | 6/1973 | Nalley . |
| 3,750,139 | 7/1973 | Blishak . |
| 3,752,393 | 8/1973 | Moseley . |
| 3,802,261 | 4/1974 | Zimmerman et al. . |
| 3,899,786 | 8/1975 | Greubel et al. . |
| 3,980,865 | 9/1976 | Messer et al. . |
| 4,227,246 | 10/1980 | Vaughan, III et al. . |
| 4,306,233 | 12/1981 | Westbrook . |
| 4,357,670 | 11/1982 | McFarlane . |
| 4,371,870 | 2/1983 | Biferno . |
| 4,429,979 | 2/1984 | Terada ................................ 340/753 |
| 4,449,123 | 5/1984 | Muranaga . |
| 4,458,540 | 7/1984 | Little et al. ........................... 73/198 |

Primary Examiner—Herbert Goldstein

[57] ABSTRACT

A flowmeter has a vertical flow tube with a float member therein and an electrically illuminatable display to provide a vertically graduated scale. The numeric scale indicia are preferably provided by a multiplicity of cell clusters, each comprised of one or more electrically illuminatable cells and the cell clusters are illuminated to show selected numerical scales that are chosen as a function of the specific gravity of a fluid and the pressure of the fluid being measured. The flowmeter includes a memory device containing stored information as to numeric values corresponding to various specific gravities and pressures to generate the appropriate scales and electrical signals corresponding thereto to illuminate the display.

8 Claims, 6 Drawing Figures

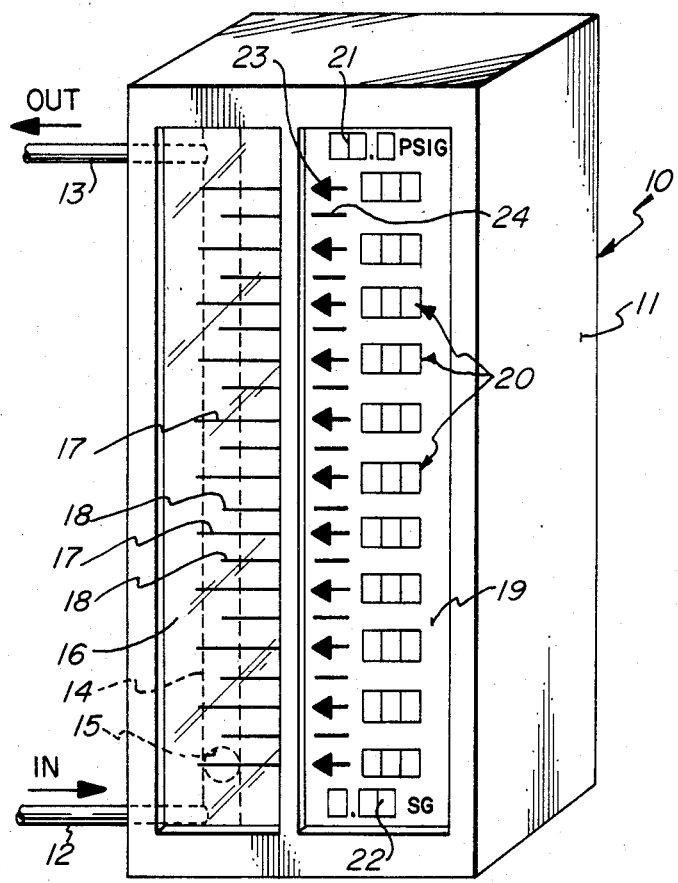
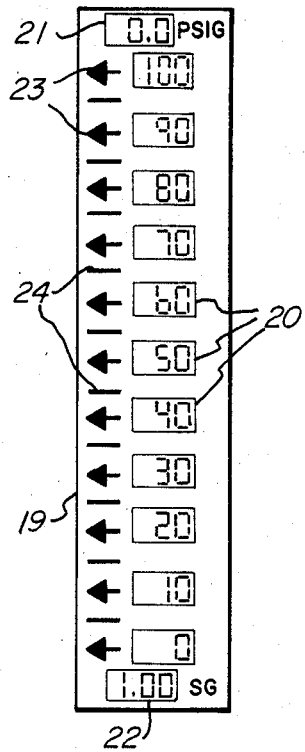
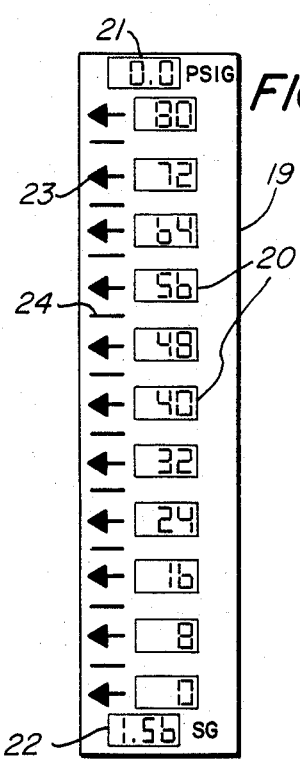
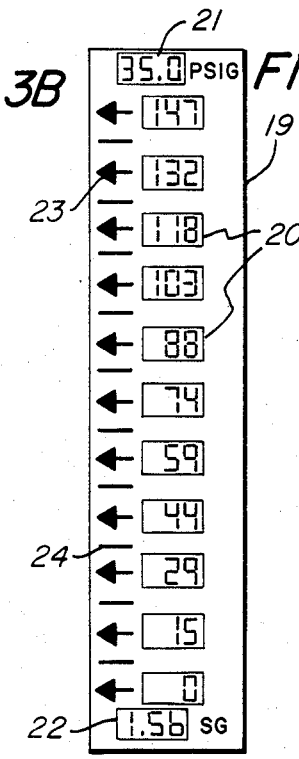
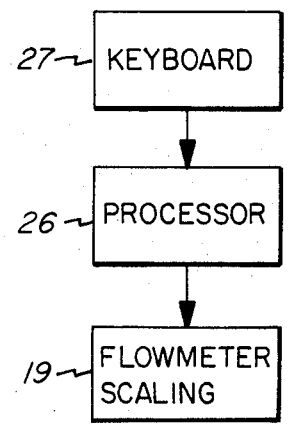

FLOWMETER WITH ELECTRONICALLY ADJUSTABLE MEASUREMENT MODULE AND DISPLAY

FIELD OF THE INVENTION

This invention relates to flowmeters and, more particularly, to flowmeters for measuring fluid flow of various gas densities at flow pressures ranging from below atmospheric pressure to positive pressures limited only by the structural strength of the flowmeter assembly.

BACKGROUND OF THE INVENTION

Flowmeters of the variable area type are well known. Such variable area flowmeters are basically tubes which are internally tapered with the larger diameter at the top. A member termed a float with an outer diameter slightly less than the operational minimum diameter of the tube is placed inside the tube and any clearance between the float and the tube forms an annular orifice. The tube is connected into a fluid line so that flow is from bottom to top and the float will move upwardly and be supported at a position where the orifice is just large enough to pass the fluid flowing through the system.

By making the tube transparent so that the float position can be seen through the tube, and by providing a scale alongside, one may read the float position in terms of numbers on the scale. These scale numbers may be of two types. The first is of an arbitrary nature which, by itself, means nothing but becomes meaningful when compared with a calibration curve; the second can be precalibrated for direct reading to show the actual flow volume in given units (for example, cubic feet per minute, or cubic centimeters per minute, etc.) of the fluid for which the meter is calibrated.

At the present time, flowmeters of the type described are readily available from several manufacturers. They are usually purchased calibrated for a particular gas of known specific gravity and calibrated in flow rates at atmospheric pressure. For example, a flowmeter calibrated for air, which has a specific gravity of 1.0, is calibrated in standard cubic feet per hour (scfh) where scfh indicates a flow rate at one atmosphere at 72° Fahrenheit.

Flowmeters used for gases of different specific gravities and/or at different pressures require flow rate conversions based on equations of perfect gas laws. These conversions can be somewhat tedious and error prone. At the present time, there are no known flowmeters available which provide direct reading flow rates for gases of various densities and/or pressures.

Accordingly, the present invention provides a new and improved flowmeter which is so arranged that it may provide direct reading flow rates for various densities and/or pressures.

Another object of this invention is to provide a new and improved flowmeter where the scale indicia may be programmed in accordance with the pressure and specific gravity of the fluid to be tested.

A further object of this invention is to provide an improved flowmeter of the type described where the scale indicia of the flowmeter are represented by selectively programmmed electrically illuminated cells in accordance with the specific gravity and the pressure of the fluid to be tested.

SUMMARY OF THE INVENTION

Briefly stated, the invention includes an internally tapered transparent flow tube receiving therein a float member which will move upwardly in the tube depending upon the fluid flowing from bottom to top of the tube. The tube is disposed within a housing which has an input line to the bottom of the tapered tube, and an output line from the top thereof. Positioned closely adjacent the tube is a vertically extending, electrically illuminatable display panel. Memory means containing data for generating a multiplicity of graduated vertical scales corresponding to specific gravity values for fluids to be measured, generates electrical signals to illuminate the display panel and provide a selected scale of values adjacent the tube. Manipulatable means is connected to the memory means to input data including the specific gravity of the fluid and thereby to generate the electrical signals to illuminate the display panel to provide a graduated vertical scale of numeric values with an upper numeric value which is a function of the specific gravity of the fluid and its pressure and with descending graduated values to a lower numeric value adjacent the lower end thereof.

In the preferred embodiment, the display will include numeric and linear indicia which are defined by a multiplicity of electrically illuminatable cells such as liquid crystal displays (LCD) or light emitting diodes (LED). In the various embodiments, the numeric indicia to be displayed are generated by a programmed microprocessor in response to keyboard input, which input is determined by the specific gravity of the fluid and the line pressure thereof.

BRIEF DESCRIPTION OF THE DRAWINGS

FIG. 1 is an perspective view of a flowmeter embodying the invention showing the flow tube in dotted line, the graduations and a scale where numeric indicia will be displayed;

FIG. 2 is exemplary, of an electrically illuminated cell cluster used in the invention;

FIGS. 3A, 3B, and 3C show the scale of the flowmeter of FIG. 1 with different numeric indicia presented thereon; and FIG. 4 is a block diagram showing the relationship of the flowmeter scaled by a keyboard and microprocessor input.

DETAILED DESCRIPTION OF PREFERRED EMBODIMENT OF THE INVENTION

A flowmeter 10 embodying the invention is shown in FIG. 1 and comprises a housing member 11 having a fluid input line 12 and a fluid outflow line 13. The input line is connected to a flow tube 14 within housing 11 at the bottom thereof; and outflow line 13 is connected to flow tube 14 at the top thereof. Fluid entering the flowmeter will enter through line 12, pass upwardly through flow tube 14, and exit through tube 13.

The tube 14 has a slight internal taper providing an increasing diameter from the bottom thereof to the top thereof, and receives therein a float member 15 which rests at the zero or lowest scale indicium when the flowmeter is not in use. Flow tube 14 is transparent and is positioned behind a transparent window 16 having major division scale linear indicia 17 and minor scale linear indicia 18 therebetween.

The housing 11 has a display panel 19 adjacent the window 16 and it includes a multiplicity of electrically illuminatable cell clusters 20, each comprised of one or more electrically illuminatable displays which are exemplified as being in the form of a conventional seven segment liquid crystal displays shown in FIG. 2. FIG. 1 exemplifies a panel 19 with a multiplicity of cell clusters 20 and corresponding arrow indicia which may be selectively illuminated in accordance with a desired scale graduation. In the embodiment shown, cell clusters 20 are uniformly vertically spaced, but this is not always practical as will be appreciated. A cell cluster 21 is also provided at the top of panel 19 to indicate the pressure in pounds per square inch gauge (PSIG) of the fluid under test. Also, on panel 19 is a cell cluster 22 to indicate the specific gravity of the fluid under observation.

As shown in FIG. 3A, the cell clusters 21 and 22 are illuminated and the cell clusters 20 are illuminated to show graduations from zero to one hundred in ten unit intervals with an arrow indicium 23 adjacent each numeric indicium and another scale indicium 24 intermediate the arrow indicia. The arrow indicia 23 are aligned with the line indicia 17 on the window 16, and the intermediate indicia 24 are aligned with the intermediate indicia 18 on the panel 16.

It is to be understood that all of the numeric indicia 17,18 and 21,22, and the linear indicia 23,24, on the display panel 19 may be defined by electrically illuminatable cells and the scales changed in accordance with an algorithm which processes the inputted data as to specific gravity and line pressure.

As seen in FIG. 4, the display panel 19 is illuminated by electrical signals from a microprocessor 26 which processes data inputted from the manual keyboard 27 to convert the inputted values for specific gravity and line pressure to a series of numeric values corresponding to a scale for the fluid to be measured and generates the appropriate electrical signals to illuminate the panel 19 accordingly. The keyboard 27 may be a part of the housing 10, or a separate element connected thereto by a cable.

Reference is now made to FIG. 3B, which shows the panel 19 with cell cluster 21 illuminated to show zero gauge pressure (PSIG) and a specific gravity of 1.56. Here, the cell clusters 20 have been programmed to show a scale of zero to eighty in increments of eight units. FIG. 3C exemplifies the panel 19 with the cell clusters illuminated to show a range of zero to one hundred forty-seven in predetermined increments, at a gauge pressure of 35.0 and specific gravity of 1.56.

The scale of FIG. 3A is for air at a specific gravity of 1.0 at atmospheric pressure allowing flow measurement of zero to one hundred volume units per unit time.

The scale of FIG. 3C is for propane having a specific gravity of 1.56 at 35 PSIG. Within the same measureable limits of the flowmeter, the scale indicia have been computed to allow flow measurements between zero and one hundred forty-seven volume units per unit time.

The scales are calculated by a microprocessor as follows:

$$Q_2 = Q_1 \left( \frac{1}{SG_2} \right)^{\frac{1}{2}}$$

where
Q₂ is the corrected flow
Q₁ is the flow at SG=1.00 (air)
SG₂ is the specific gravity of the gas For air at a specific gravity of 1.0, $Q_1 = 100$
For propane at atmospheric pressure (FIG. 3b):

$$Q_2 = 100 \left( \frac{1}{1.56} \right)^{\frac{1}{2}}$$

$$Q_2 = 80$$

Thus the scale is set for zero to eighty with a numeral scale in increments of eight.

Where the gas is propane and the pressure (PSIG) is 35.0 (FIG. 4B), the scale is derived as follows:

$$Q_2 = Q_1 \left( \frac{P_2}{P_1} \right)^{\frac{1}{2}}$$

where
Q₂ is the corrected flow at pressure P₂
Q₁ is the flow at pressure P₁
P₂ is the absolute pressure at Q₂
P₁ is the absolute pressure at Q₁
then $$Q_2 = 80 \left( \frac{35.0 + 14.7}{14.7} \right)^{\frac{1}{2}}$$

$$Q_2 = 147$$

Generally, the software in the microprocessor will utilize an algorithm which reflects the effect of both specific gravity and line pressure, i.e.:

$$Q_2 = Q_1 \left( \frac{1}{SG_2} \right)^{\frac{1}{2}} \left( \frac{P_2}{P_1} \right)^{\frac{1}{2}}$$

As used herein, "line pressure" refers to the pressure at the inlet to the flowmeter.

The foregoing calculations are preferably performed in a microprocessor 26 (FIG. 4) with input of specific gravity of the gas and pressure from an input device such as the keyboard 27. The microprocessor is programmed to calculate the appropriate scale if the cell clusters 20 are only of a predetermined number (eleven as shown) and to divide the scale into substantially equal intervals depending on the value Q₂ for an inputted specific gravity and fluid pressure. Alternately, if a larger number of cell clusters are provided on panel 19 (for example, thirty or more), the microprocessor 26 will select a sub-multiple in accordance with the upper value Q₂ and illuminate selected cell clusters to provide an essentially evenly graduated scale between zero and Q₂, or a lowest scale number and the highest scale number. The lowest scale number desired may be other than zero.

Where the difference between zero and Q₂ cannot be graduated in equal intervals in view of the number of cell clusters provided, the microprocessor is programmed to adjust the numbers applied to the graduations in accordance with the closest prime number divisor of Q₂. This is the case as illustrated in FIG. 3C, where it will be noted that the scale is divided into seven increments of fifteen and three increments of fourteen.

The calculations for this are set forth below:

1. Calculate $Q_2$ in view of inputted specific gravity and PSIG.
2. Determine lowest scale number if other than zero. Inputted by operator.
3. Determine difference N between $Q_2$ and the lowest scale number.
4. Determine the closest number $N_1$ divisible into N by ten and equal to or greater than $10N_1$.
5. Determine the difference between $10N_1$, and N.
6. Adjust the scale numbers so that the difference is spread substantially uniformly along the scale numbers.
7. Illuminate the cell clusters 20 in graduations of $N_1$; or $N_1$ and $N_1-1$.

Where the panel 19 contains more than eleven vertically aligned cell clusters, selected clusters may be illuminated in any pattern to attempt to make the scale graduated as uniformly as possible. In such cases, eleven cell clusters or more or less than eleven cell clusters may be illuminated.

Alternatively, each cell cluster may be provided with an additional cell so that the scale numbers could be carried to tenths. In this manner, all scale numbers could be uniformly graduated with eleven cell clusters.

As will be appreciated, both the numeric values and the linear graduations may be generated by electrical signals to the illuminatable display panel, or the linear graduations may be imprinted in fixed positions with the appropriate numeric values being generated adjacent thereto. Obviously, generation of both sets of indicia by the microprocessor provides the greatest flexibility, and the opportunity for providing scales with values permitting more facile interpolation. In the illustrated embodiment, the window has linear graduations imprinted thereon, but the illuminatable display panel may include an illuminatable transparent window portion to electrically generate the linear graduations in front of the tube.

It will also be appreciated that cathode ray tube and other electrically illuminatable and variable display devices may be utilized.

Although the illustrated embodiment calls for the operator to enter the value of the line pressure, the flowmeter can include a pressure transducer to sense the inlet pressure and vary the calculations dynamically in response to variations in such pressure. Moreover, the flowmeter can also measure temperature, and the algorithm can be modified to effect the variations in flow rate that would be reflected by variations in temperature. Generally, however, these transient changes can be discounted.

It must thus be seen that the objects of the invention set forth, as well as those made apparent from the foregoing description, are efficiently attained. Although a preferred embodiment of the invention has been set forth for purposes of disclosure, modifications to the disclosed embodiment of the invention, as well as other embodiments thereof, may occur to those skilled in the art. Accordingly, the appended claims are intended to cover all embodiments of the invention and modifications to the disclosed embodiments which do not depart from the spirit and scope of the invention.

Having thus described the invention, what is claimed is:

1. A flowmeter comprising a vertical tube tapering slightly from bottom to top; a float member in said tube adapted to be moved upwardly in said tube by fluid flow therein and indicate the rate of fluid flow through said tube; means for connecting said tube in a fluid flow line whereby the fluid in the line moves upwardly through said tube and displaces said float member upwardly from an at rest position and the position of said float member in said tube is indicative of the flow rate of the fluid; a vertically extending, electrically illuminatable display positioned adjacent said tube and adapted to display a plurality of sets of numeric values in response to electrical signals received thereby; memory means containing data for generating a multiplicity of graduated vertical scales corresponding to specific gravity values for fluids to be measured and the line pressure of the fluid being measured and for providing electrical signals corresponding to the numeric values of a selected scale to illuminate said display; and manipulatable means connected to said memory means for inputting specific gravity values and thereby illuminating said display to provide a graduated vertical scale of numeric values with an upper numeric value which is a function of the specific gravity of the fluid and the pressure of the fluid and is descendingly graduated to a lower numeric value adjacent the lower end thereof.

2. The flowmeter of claim 1 wherein said display comprises a multiplicity of illuminatable cell clusters.

3. The flowmeter of claim 2 wherein said memory means includes a microprocessor, said microprocessor determining the scale graduations displayed by said cell clusters in response to manual inputting of the specific gravity of fluid and the line pressure of the fluid.

4. The flowmeter of claim 3 wherein said display further includes a portion actuated by said microprocessor and manipulatable means for displaying the specific gravity and line pressure values inputted to said microprocessor.

5. The flowmeter of claim 1 wherein said display includes a portion actuated by said manipulatable means for indicating the specific gravity and the pressure of the fluid values inputted to the flowmeter.

6. The flowmeter of claim 1 wherein said illuminatable display provides both linear graduations and the associated numeric values.

7. The flowmeter of claim 1 wherein said display includes linear graduations imprinted thereon and said memory means and manipulatable means generate electrical signals to produce numeric values adjacent thereto.

8. The flowmeter of claim 7 wherein said tube and said display includes a transparent window extending over said tube and linear graduations are imprinted thereon.

* * * * *